United States Patent
Schober et al.

(10) Patent No.: US 12,453,661 B2
(45) Date of Patent: Oct. 28, 2025

(54) ABSORBENT ARTICLE WITH CLOSURE MECHANISM

(71) Applicant: The Procter & Gamble Company, Cincinnati, OH (US)

(72) Inventors: Christine Elisabeth Schober, Lauda-Königshofen (DE); Melek Yildirim, Rheinland Pfalz (DE); Ekaterina Ponomarenko, Mechernich (DE); Andrea Lieselotte Benner, Schwalbach (DE); Natalia Nikolaewna Gaiko, Kronberg (DE)

(73) Assignee: The Procter & Gamble Company, Cincinnati, OH (US)

( * ) Notice: Subject to any disclaimer, the term of this patent is extended or adjusted under 35 U.S.C. 154(b) by 812 days.

(21) Appl. No.: 17/674,907

(22) Filed: Feb. 18, 2022

(65) Prior Publication Data

US 2022/0287893 A1    Sep. 15, 2022

Related U.S. Application Data

(60) Provisional application No. 63/159,490, filed on Mar. 11, 2021.

(51) Int. Cl.
*A61F 13/551*    (2006.01)
*A61F 13/49*     (2006.01)
(Continued)

(52) U.S. Cl.
CPC ...... *A61F 13/622* (2013.01); *A61F 13/49001* (2013.01); *A61F 13/49009* (2013.01);
(Continued)

(58) Field of Classification Search
CPC ............ A61F 13/5512; A61F 13/622; A61F 13/49001; A61F 13/49009; A61F 13/4963;
(Continued)

(56) References Cited

U.S. PATENT DOCUMENTS 5,797,896 A * 8/1998 Schmitz ............ A61F 13/627
                                                    604/389
7,717,896 B2   5/2010 Otsubo et al.
(Continued)

FOREIGN PATENT DOCUMENTS

| EP | 1021150 B1    | 12/2002 |
|----|---------------|---------|
| EP | 1541105 A1    | 6/2005  |
| JP | H03176051 A   | 7/1991  |
| JP | 2001112817 A  | 4/2001  |
| JP | 2002052043 A  | 2/2002  |
| JP | 2002320637 A  | 11/2002 |
| JP | 2009253123 A  | 10/2009 |

(Continued)

OTHER PUBLICATIONS

15987Q PCT Search Report and Written Opinion for PCT/US2022/019078 dated Jun. 23, 2022, 13 pages.

*Primary Examiner* — Susan S Su
(74) *Attorney, Agent, or Firm* — Charles R. Matson; Sarah M. DeCristofaro

(57) ABSTRACT

Embodiments relate to an absorbent pant that includes longitudinally opposing first and second waist regions and a crotch region between the first and second waist regions. Longitudinally opposing first and second waist panels are disposed in the first and second waist regions and connect to form a waist opening and a pair of leg apertures. A fastening zone area is disposed on at least one surface of the absorbent pant. In a wrapped configuration, at least one of the waist panels is configured to be laterally folded inward to engage the fastening zone area such that at least one of the leg apertures is at least partially sealed.

15 Claims, 10 Drawing Sheets

(51) Int. Cl.
  *A61F 13/496* (2006.01)
  *A61F 13/60* (2006.01)
  *A61F 13/62* (2006.01)
  *A61F 13/514* (2006.01)

(52) U.S. Cl.
  CPC ...... *A61F 13/4963* (2013.01); *A61F 13/5512* (2013.01); *A61F 13/60* (2013.01); *A61F 2013/49088* (2013.01); *A61F 2013/51452* (2013.01)

(58) Field of Classification Search
  CPC ............ A61F 13/60; A61F 2013/49088; A61F 2013/51452; A61F 2013/582; A61F 2013/588; A61F 13/565; A61F 13/496
  See application file for complete search history.

(56) References Cited

U.S. PATENT DOCUMENTS

| | | | |
|---|---|---|---|
| 2002/0004655 A1* | 1/2002 | Shimada | A61F 13/5512 604/385.03 |
| 2009/0299318 A1* | 12/2009 | Faulks | A61F 13/551 604/385.03 |
| 2017/0112682 A1* | 4/2017 | May | A61F 13/4915 |
| 2018/0050484 A1* | 2/2018 | Rocha | B29C 35/0261 |

FOREIGN PATENT DOCUMENTS

| | | |
|---|---|---|
| JP | 2011104171 A | 6/2011 |
| WO | 2019101346 A1 | 5/2019 |

* cited by examiner

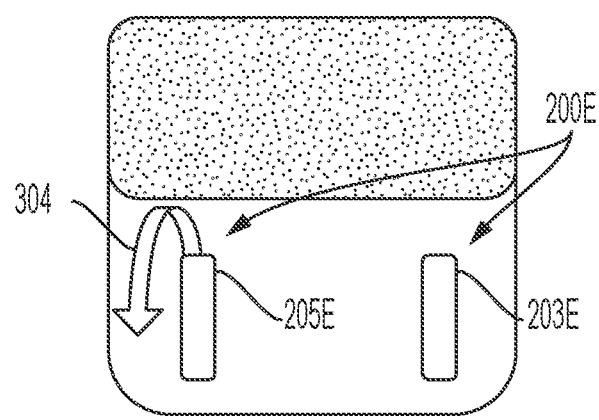
FIG. 3E
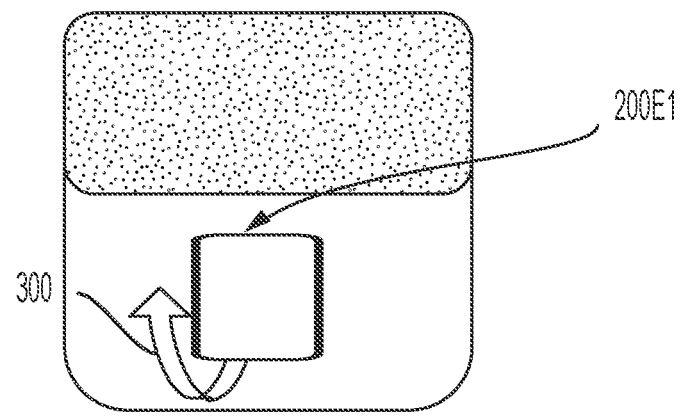
FIG. 3E1

ABSORBENT ARTICLE WITH CLOSURE MECHANISM

TECHNICAL FIELD

The present specification generally relates to an absorbent pant for inward lateral folding and engagement over a leg aperture, and in particular to an absorbent pant for inward folding and engagement over a leg aperture with a fastening zone area to at least partially seal the leg aperture.

BACKGROUND

Infants and other incontinent individuals wear absorbent articles such as diapers or absorbent pants to receive and contain urine and other body fluids such as a feces. Absorbent pants may include pull-on absorbent articles, or pant-type absorbent articles, which are donned by inserting the wearer's legs into pre-formed leg openings and sliding the article up into position about the lower torso.

In an after use configuration, however, the leg apertures may remain open, potentially allowing urine and feces to seep out of the absorbent pant.

Based on the foregoing, there is a need for alternative absorbent patents and methods of use and manufacture to more efficiently prevent bodily exudates from seeping out of a used and soiled absorbent pant after removal, including while disposing and once in waste containers. Further, there is a need to provide a convenient and/or more hygienic means for disposing of a soiled absorbent article.

SUMMARY

This disclosure comprises the features of the independent claims herein.

An absorbent pant comprises a chassis comprising a topsheet, a backsheet, and an absorbent core between the topsheet and the backsheet; longitudinally opposing first and second waist regions, and a crotch region disposed between the first and second waist regions; and opposing first and second waist panels longitudinally disposed in the first and second waist regions. The first and second waist panels connect the first waist region with the second waist region to form a waist opening and a pair of leg apertures. The absorbent pant also comprises a fastening zone area on at least one surface of the absorbent pant and a release tape disposed in an overlapping relationship with the fastening zone area, wherein the fastening zone area comprises an area of at least 1 cm². In a wrapped configuration, at least one of the waist panels is configured to be laterally folded inward to engage the fastening zone area such that at least one of the leg apertures is at least partially sealed.

An absorbent pant comprises a chassis comprising a topsheet, a backsheet, and an absorbent core between the topsheet and the back sheet; longitudinally opposing first and second waist regions and a crotch region disposed between the first and second waist regions; opposing first and second waist panels longitudinally disposed in the first and second waist regions; and a fastening zone area on at least one surface of the absorbent pant. At least a portion of a release tape is disposed in an overlapping relationship with the fastening zone area in a taped configuration and configured to be separated from the fastening zone area in a released configuration to be released from the overlapping relationship. In a wrapped configuration, at least one of the waist panels is configured to be laterally folded inward to engage the fastening zone area when the portion of the release tape is separated from the fastening zone area in the released configuration such that at least one of the leg apertures is at least partially sealed.

An absorbent pant comprises a chassis, the absorbent pant comprising longitudinally opposing first and second waist regions and a crotch region disposed between the first and second waist regions; opposing first and second waist panels longitudinally disposed in the first and second waist regions. The first and second waist panels connect the first waist region with the second waist region to form a waist opening and a pair of leg apertures. The absorbent pant comprises a fastening zone area comprising first and second arms. The first and second arms are separated by a lateral distance at a first longitudinal location and intersect at a second longitudinal location. The second longitudinal location longitudinally displaced with respect to the first longitudinal location. In a wrapped configuration, at least one of the waist panels is configured to be laterally folded inward to engage the fastening zone area such that at least one of the leg apertures is at least partially sealed.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3E schematically illustrates a double longitudinally extending rectangular fastening zone area and release tape embodiment for the absorbent pant shown in FIG. 1, according to one or more embodiments shown and described herein;

FIG. 3E1 schematically illustrates a rectangular fastening zone area and release tape embodiment for the absorbent pant shown in FIG. 1, according to one or more embodiments shown and described herein;

DETAILED DESCRIPTION

Figure 1:
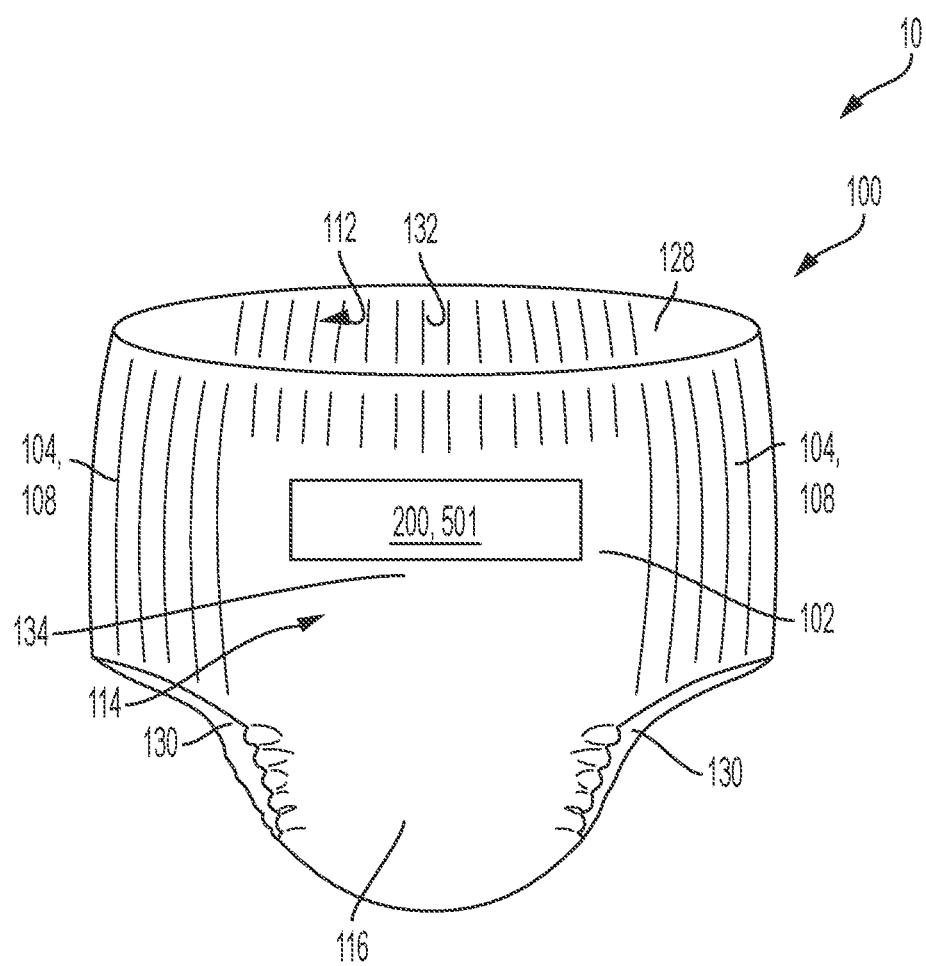
FIG. 1 is a perspective view of an absorbent pant, according to one or more embodiments shown and described herein.

Reference will now be made in detail to embodiments of absorbent pants, aspects of which may include non-woven surface protrusions, as well as to formation systems and methods of manufacture and wrapping of said absorbent pants, examples of which are illustrated in the accompanying drawings. Whenever possible, the same reference numerals will be used throughout the drawings to refer to the same or like parts. Various embodiments of such absorbent patents, systems, and methods will be described in further detail herein with specific reference to the appended drawings.

Figure 2:
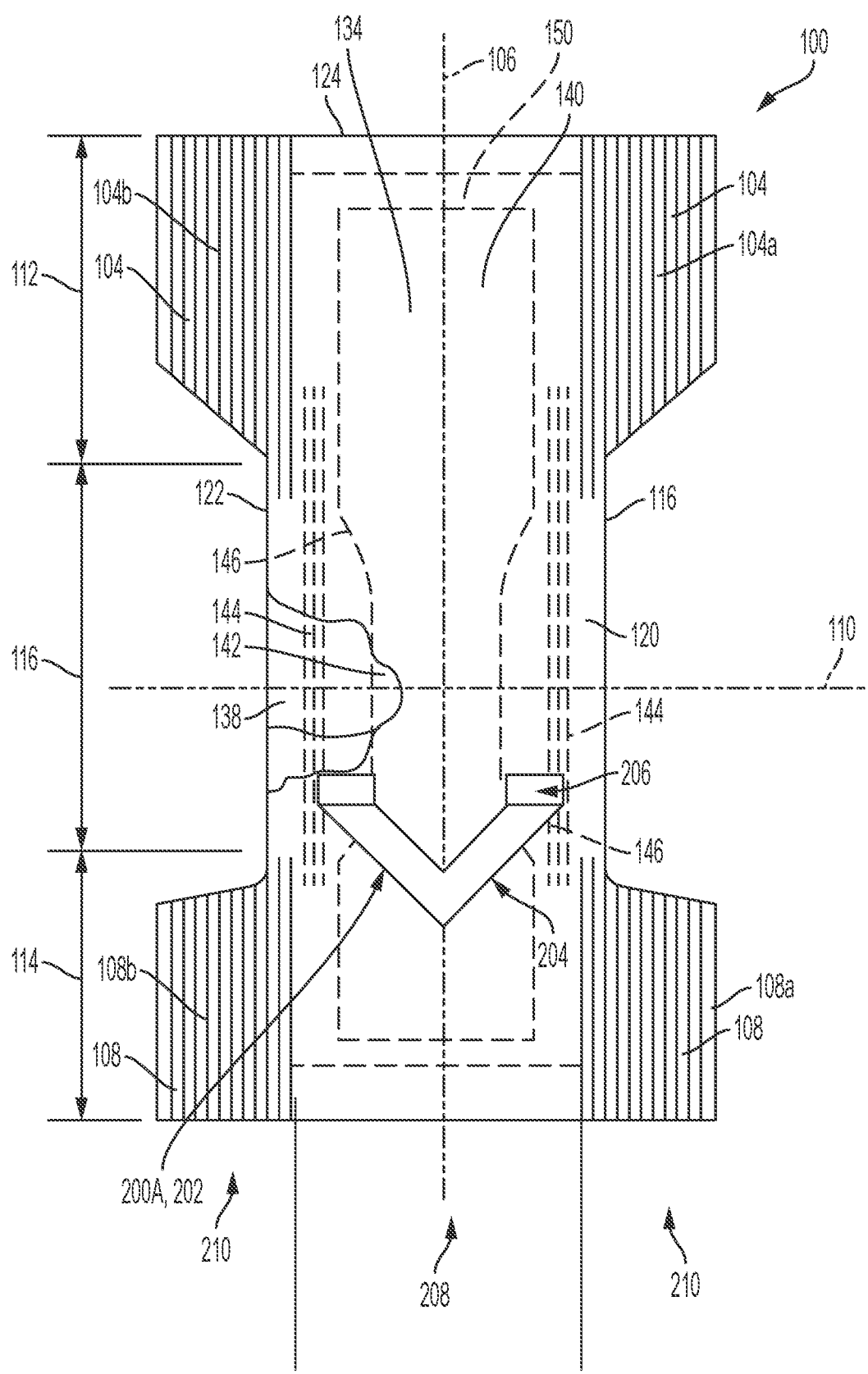
FIG. 2 is a partially cut away plan view of the absorbent pant shown in FIG. 1, showing an exterior portion that faces away from a wearer.

Overview Referring to FIGS. 1-2, the present disclosure is directed to an absorbent article 10, shown in the form of an absorbent pant 100, which may comprise an absorbent pant 100 for a child or an adult incontinence product. Although shown in the form of a pant, it is also contemplated that the absorbent article 10 may comprise another form. The absorbent article 10 includes a chassis 102 comprising a topsheet 138, backsheet 140, and absorbent core 142 disposed therebetween. The article 10 also includes longitudinally opposing first and second waist regions, as a first waist region 112 and a second waist region 114, and a crotch region 116 disposed between the first and second waist regions 112, 114. In the illustrated absorbent pant, opposing first and second waist panels 104, 108 are longitudinally disposed in the first and second waist regions 112, 114. The chassis 102 is disposed in the crotch region 116 and may extend in the first and/or second waist regions 112, 114. In various embodiments, the first and second waist regions 112, 114 comprise belt regions joined to or integral with the chassis 102. Such belt regions may be elastic belt regions. By way of example, and not as a limitation, the belt regions may be made of elongatable material that recovers at least 40% of its elongation upon release of an applied force to be considered "elastic" or "elastomeric." It is to be understood and within the scope of this disclosure that reference to the chassis 102 for the absorbent article 10 or absorbent pant 100 as described herein may cover either embodiment in which the chassis 102 encompasses the crotch region 116 or the chassis encompasses the crotch region 116 and one or more portions of the first and second waist regions 112, 114. Further, in a wrapped configuration as described in greater detail further below, at least one waist panel 104, 108 may be laterally folded inward to engage a fastening zone area 200 on the first waist region 112, the second waist region 114, or the crotch region 116 to cover at least a portion of a leg aperture 130 as at least partial seal to contain, prevent, and/or minimize the chances of bodily fluids and/or solids from seeping out of a used absorbent article 10.

As shown in FIG. 2, the first waist region 112 may include a first-side first waist panel 104a and a laterally opposing second-side first waist panel 104b. The second waist region 114 may include a first-side second waist panel 108a and a laterally opposing second-side second waist panel 108b. Thus, opposing first waist panels 104a, 104b are respectively longitudinally disposed with respect to opposing second waist panels 108a, 108b. The opposing first waist panels 104a, 104b are disposed in the first waist region 112, and the opposing second waist panels 108a, 108b are disposed in the second waist region 114.

Although the waist panels 104, 108 shown in FIGS. 1 and 2 are side panels, it is to be appreciated that the waist panel 104 may be a single unitary piece construction extending across the chassis 102 and/or the waist panel 108 may be a single unitary piece construction extending across the chassis 102. In some embodiments, waist panels 104, 108 together are formed of a single unitary piece construction. It should be appreciated that the waist panels 104, 108 may also be formed as continuous extensions of one or both the first and second waist regions 112, 114 of the chassis. It is also to be appreciated that embodiments of the absorbent pant 100 that may be used with the methods and apparatuses herein may include various different types and configurations of waist panels 104, 108 than those shown and described herein. Examples of various types of waist panels 104, 108 are disclosed in U.S. Pat. Nos. 5,246,433; 5,569, 234; 6,120,487; 6,120,489; 5,897,545; 5,957,908; and U.S. Patent Publication No. 2003/0233082, all of which are incorporated herein by reference.

Figure 3A:
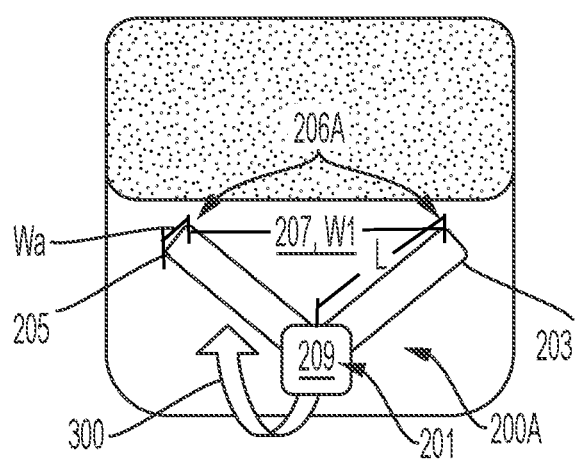
FIG. 3A schematically illustrates a V-shaped fastening zone area and release tape embodiment for the absorbent pant shown in FIG. 1, according to one or more embodiments shown and described herein.
Figure 3B:
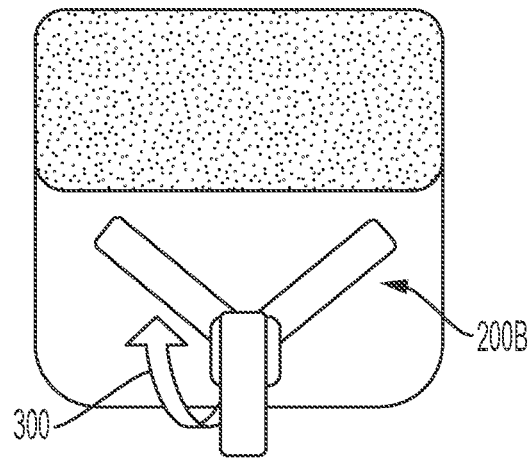
FIG. 3B schematically illustrates a Y-shaped fastening zone area and release tape embodiment for the absorbent pant shown in FIG. 1, according to one or more embodiments shown and described herein.
Figure 3C:
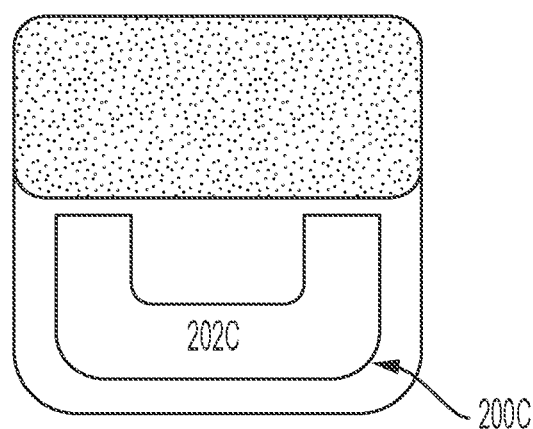
FIG. 3C schematically illustrates a U-shaped fastening zone area and release tape embodiment for the absorbent pant shown in FIG. 1, according to one or more embodiments shown and described herein.
Figure 4:
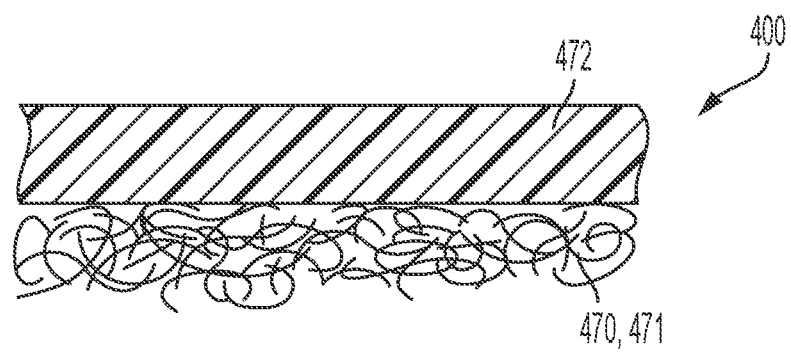
FIG. 4 schematically illustrates a nonwoven material section for protrusion receiving zones including loops for the absorbent pant shown in FIG. 1, according to one or more embodiments shown and described herein.
Figure 5:
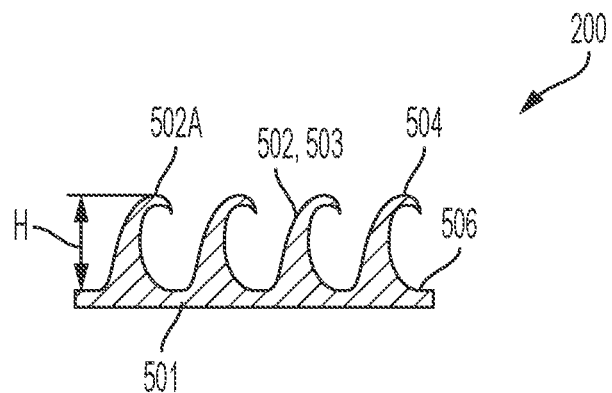
FIG. 5 schematically illustrates an embodiment of surface protrusions including hooks with a distal curved hook end, according to one or more embodiments shown and described herein.

Referring to FIG. 2, the first waist panels 104 and second waist panels 108 connect the first waist region 112 with the second waist region 114 to form a waist opening 128 and a pair of leg apertures 130 as depicted in FIG. 1. The article also includes a fastening zone area 200 on at least one surface. In embodiments, the fastening zone area may comprise an area of at least 1 cm$^2$, or of at least 15 cm$^2$ (150 mm$^2$). The fastening zone area 200 may be disposed on the garment-facing surface 134 in the first waist region 112, crotch region 116 or second waist region 114 or suitable combination thereof. In a wrapped configuration, as shown in FIG. 3H described in greater detail below, at least one of the waist panels 104, 108 is configured to be laterally folded inward to engage the fastening zone area 200 such that at least one of the leg apertures 130 is at least partially sealed. As a non-limiting example, in the wrapped configuration, the at least one waist panel 104, 108 that is laterally folded inward to engage the fastening zone area 200 covers at least a portion of one of the leg apertures 130 as the at least partial seal to contain, prevent, and/or minimize the chances of bodily fluids and/or solids from seeping out of a used absorbent pant 100. In embodiments, the fastening zone area 200 may include a plurality of fastening elements. In non-limiting examples, the fastening elements comprise hooks integrally formed from any suitable material, including but not limited to a nonwoven material, a film, a hot melt material, an adhesive, or combinations thereof. The material may include a nonwoven substrate 470 as shown in FIG. 4, and the plurality of hooks may be one or more surface protrusions 502 as shown in FIG. 5, which are both described in greater detail further below. Additionally or alternatively, as described in greater detail below, the absorbent pant 100 may include a release tape 202 as shown in FIGS. 2-3E, which are described in greater detail further below. At least a portion of the release tape 202 may be disposed in an overlapping relationship with the fastening zone area 200 in a taped configuration and configured to be separated from the fastening zone area 200 in a released configuration to be released from the overlapping relationship. The release tape 202 may encompass a surface area greater than or equal to a surface area of the fastening zone area 200 that it overlaps. In other additional or alternative aspects, as shown in FIGS. 2-3C, the fastening zone area 200 may include a first arm 203 and a second arm 205. As shown in FIG. 3A, the first arm 203 and the second arm 205 may be laterally separated by a first width, W1, at a first longitudinal location 207 and intersect at a second longitudinal location 209 that is longitudinally displaced with respect to the first longitudinal location 207. In embodiments, the first width may be from about 50 mm to about 150 mm, or from about 60 mm to about 100 mm, reciting for each range every 1 mm increment therein. The arms may comprise a width, Wa of about 10 mm to about 50 mm, or from about 15 mm to about 30 mm, reciting for each range every 1 mm increment therein. The arms may comprise a width, Wa, of about 10 mm to about 50 mm, or from about 15 mm to about 30 mm, reciting for each range every 1 mm increment therein. The arms may comprise the same width or different widths. The longitudinal distance, L, that the arms extend may be from about 30 mm to about 100 mm, or from about 40 mm to about 60 mm, reciting for each range every 1 mm increment therein.

Definitions

"Absorbent article" such as absorbent pants as used herein refers to devices such as consumer products that absorb and contain body exudates and, more specifically, refers to devices which are placed against or in proximity to the body of the wearer to absorb and contain the various exudates discharged from the body such as soils and wastes. Exemplary absorbent articles include diapers, training pants, pull-on pant-type diapers (i.e., a diaper having a pre-formed waist opening and leg openings such as illustrated in U.S. Pat. No. 6,120,487), refastenable diapers or pant-type diapers, incontinence briefs and undergarments, diaper holders and liners, feminine hygiene garments such as panty liners, absorbent inserts, and the like. Non-limiting examples of absorbent pants include training pants, pull-on or refastenable pant-type diapers, incontinence briefs and undergarments, and the like.

The term "disposable" is used herein to describe absorbent articles which generally are not intended to be laundered or otherwise restored or reused as an absorbent article (e.g., they are intended to be discarded after a single use and may also be configured to be recycled, composted, or otherwise disposed of in an environmentally compatible manner. Embodiments of the absorbent pants described herein are disposable.

The terms "absorbent pant" and "pant" (also referred to as "diaper pant," "training pant," "pre-closed diaper," "pant diaper," and "pull-on diaper") refers herein to disposable absorbent articles having a continuous perimeter waist opening and laterally opposing continuous perimeter leg openings designed for infant or adult wearers. For the avoidance of doubt, adult incontinence articles may be in the form of absorbent pants. A pant can be configured with a continuous or closed waist opening and at least one continuous, closed, leg opening as packaged, prior to the article being applied to the wearer. A pant can be preformed by various techniques including, but not limited to, joining together portions of the article using any refastenable and/or permanent closure member (e.g., seams, heat bonds, pressure welds, adhesives, cohesive bonds, mechanical fasteners, etc.). A pant can be preformed anywhere along the circumference of the article in the waist region (e.g., side fastened or seamed, front waist fastened or seamed, rear waist fastened or seamed or combinations thereof). Example pants are disclosed in various configurations are disclosed in U.S. Pat. Nos. 5,246,433; 5,569,234; 6,120,487; 6,120,489; 5,897,545; 5,957,908; 10,117,787; and U.S. Patent Publication No. 2003/0233082.

In regard to structural terms, the term "disposed" is used herein to mean that an element(s) is located in a particular place or position as a macro-unitary structure with other elements or as a separate element joined to another element.

As used herein, the term "joined" encompasses configurations whereby an element is directly secured to another element by affixing the element directly to the other element, and configurations whereby an element is indirectly secured to another element by affixing the element to intermediate member(s), which in turn are affixed to the other element.

In regard to directional terms, "longitudinal" as used herein means a direction running substantially along an axis from a waist edge to a longitudinally opposing waist edge of an absorbent article when the article is in a flat out, uncontracted state, or from a waist edge to the bottom of a crotch region, i.e. the fold line, in a bi-folded article. Longitudinally-extending" refers to components having a longitudinal dimension which is greater than said component's lateral dimension.

"Lateral" as used herein refers to a direction running from a longitudinally extending side edge to a laterally opposing longitudinally extending side edge of an article and generally at a right angle and perpendicular to the longitudinal direction. "Laterally-extending" refers to components having a lateral dimension which is greater than said component's longitudinal dimension.

In regarding to configuration terms, "design element" as used herein means a shape or combination of shapes that visually create a distinct and discrete component, regardless of the size or orientation of the component. A design element may be present in one or more patterns. A design element may be present one or more times within one pattern. In one non-limiting example, the same design element is present twice in one pattern—the second instance of the design element is smaller than the first instance. One of skill in the art will recognize that alternative arrangements are also possible. Design elements may comprise insignia. Design elements and/or combinations of design elements may comprise letters, words and/or graphics such as flowers, butterflies, hearts, character representations and the like. Design elements may be formed from bonds, including the shape of one or more bond(s). Design elements and/or combinations of design elements may comprise instructional indicia providing guidance or instruction to the caregiver relative to placement and/or fit of the article about the wearer.

"Insignia" as used herein means objects, character representations, words, colors, shapes or other indicia that can be used to distinguish, identify or represent the manufacturer, retailer, distributor or brand of a product, including but not limited to trademarks, logos, emblems, symbols, designs, figures, fonts, lettering, crests or similar identifying marks.

"Integral" means configurations whereby an element is created from or created by an article component, or portions thereof, as opposed to being joined to the component. "Integrally formed" means an element is created from an underlying material or portion thereof, by for example molding, shaping and/or reconstituting the material.

In regard to material terms used herein, the term "nonwoven" or "non-woven" refers to a material made from continuous (long) filaments (fibers) and/or discontinuous (short) filaments (fibers) by processes such as spunbonding, meltblowing, carding, and the like. In some configurations, a nonwoven may comprise a polyolefin based nonwoven, including but not limited to nonwovens having polypropylene fibers and/or polyethylene fibers and/or bicomponent fibers comprising a polyolefin. Nonlimiting examples of suitable fibers include spunbond, spunlaid, meltblown, spunmelt, solvent-spun, electrospun, carded, film fibrillated, melt-film fibrillated, air-laid, dry-laid, wet-laid staple fibers, and other nonwoven web materials formed in part or in whole of polymer fibers as known in the art, and workable combinations thereof. Nonwovens do not have a woven or knitted filament pattern. It is to be appreciated that nonwovens having various basis weights can be used in accordance with the methods herein. In embodiments, bicomponent fibers of the nonwoven material may include additives to be configured to more easily be susceptible to heating such as through infrared, which may aid with, for example, preheating or other heating of the nonwoven material as described herein.

Referring again to FIG. 2, the absorbent pant 100 in a flat, unfolded condition, with an external portion of the absorbent pant 100 that faces away from a wearer oriented towards the viewer. The pant 100 is shown with a longitudinal axis 106, a lateral axis 110, the first waist region 112, the second waist region 114, and the crotch region 116 disposed intermediate the first and second waist regions 112, 114. A periphery may be defined by a first longitudinal side edge 120, a second longitudinal side edge 122, a first waist end edge 124 disposed in the first waist region 112, and a second waist end edge disposed in the second waist region 114.

Referring to FIGS. 1 and 2, the pant 100 includes an inner, body facing surface 132 and an outer, garment facing surface 134. As shown in FIG. 2, the chassis 102 may include a topsheet 138 forming a portion of the body facing surface 132. The chassis 102 may also include a backsheet 140. In embodiments, the fastening zone area 200 may include a first nonwoven material including hooks, the first nonwoven material that is discrete from and joined to the backsheet 140 or that is part of the backsheet 140. The waist panels 104, 108 may include a second nonwoven material including loops that may be integrally formed from the second nonwoven material. As described herein, the release tape 202 may be disposed in an overlapping relationship with the fastening zone area 200 and may include a third nonwoven material, a film, or combinations thereof. The release tape 202, as described in greater detail further below with respect to FIGS. 3A-3E, may be permanently joined to the absorbent pant 100 at a first end 206A and releasably joined or unattached at a second end (for example, corresponding to the second longitudinal location 209 of FIG. 3A). In nonlimiting examples, the second end may be free from attachment to the surface of the pant or weakly attached to the surface, such that the second end comprises a lift tab 201. The lift tab 201 may be pressed against or may rest against the surface of the absorbent pant 100 in a taped configuration, such as shown in FIG. 3A, and the lift tab 201 may be configured to be easily lifted (such as in the direction of arrow 300 of FIG. 3A) as a means for the caregiver to begin to release the remaining portion of the release tape 202. The lift tab 201 may comprise a relatively small surface area to correspond with a fingertip, such that a caregiver may insert his/her finger between the lift tab 201 and the surface of the absorbent pant 100. Additionally, or alternatively, the lift tab 201 may be provided with a marking such as a textured grip material and/or color indicator. The marking may direct the caregiver's attention to the location of the lift tab 201 or otherwise indicate use of the lift tab 201 to pull the release tape 202 away from the absorbent pant 100 and reveal an underlying fastening zone area 200. In embodiments, the release tape 202 is permanently joined to the absorbent pant 100 at a first end and unattached at a second end, such that the portion of the release tape 202 comprises the second end and the second end comprises the lift tab 201 configured to aid in transitioning from the overlapping relationship to the released configuration.

Once the second end is released from against the absorbent pant 100 in a released configuration, the first end 206A may remain attached to the absorbent pant 100. The release tape 202 may be configured to cover the fastening zone area 200 in the taped configuration and to form and serve as a handle 211 (FIG. 3F) in the released configuration.

Referring back to FIG. 2, an absorbent core 142 may be disposed between a portion of the topsheet 138 and the backsheet 140. The chassis 102 may also include leg elastics 144 and an elastic waist region to enhance the fit around the legs and waist of the wearer. Example leg elastic and leg cuff embodiments are disclosed in, for example, U.S. Pat. Nos. 4,695,278 and 4,795,454. It is to be appreciated that any one or more of the regions of the chassis 102 may be stretchable and may include various types of elastomeric materials and/or laminates. As such, the absorbent pant 100 may be configured to adapt to a wearer's anatomy upon application and to maintain contact with the wearer's anatomy during wear.

As previously mentioned, the chassis 102 may include a backsheet 140, which may define the outer surface 134 of the chassis 102. In some embodiments, the backsheet 140 may be configured to prevent exudates absorbed and contained within the chassis from soiling articles that may contact the absorbent pant 100, such as bedsheets and undergarments. In certain embodiments, the backsheet 140 is substantially water-impermeable. The backsheet 140 may, example, be or comprise a thin plastic film, such as a thermoplastic film having a thickness of about 0.012 mm to about 0.051 mm. Other suitable backsheet materials may include breathable materials that permit vapors to escape from the absorbent article while still preventing exudates from passing through the backsheet 140.

Backsheet 140 may also consist of more than one layer. The backsheet 140 may comprise an outer cover and an inner layer. The outer cover may be made of a soft, nonwoven material. The inner layer may be made of a substantially liquid-impermeable film, such as a polymeric film. The outer cover and an inner layer may be joined together by adhesive or any other suitable material or method. The outer cover material may comprise a bond pattern, apertures, and/or three-dimensional features. The outer cover may be a hydroentangled nonwoven material.

In embodiments, one or more fastening elements 503 (e.g., adhesive, snaps, male/female systems) in a fastening zone area 200. The fastening zone area 200 may be disposed on the wearer-facing surface and/or the garment facing surface. In various embodiments, the fastening zone is disposed on the garment-facing surface. The fastening zone may be disposed in any suitable location on the article, including the waist regions 112, 114 and/or crotch region 116.

In certain embodiments, the fastening elements 503 comprise surface protrusions 502 (as shown in FIG. 5, and as described in greater detail further below). The fastening systems described herein may include hook and loop fasteners for securing a portion of the article 10 to the fastening zone area 200. In aspects, the surface protrusions 502 may be used with many other tape designs to secure the garment for disposal, including disposal tape systems disclosed in U.S. Pat. Nos. 6,746,434; 5,108,384; 4,869,724; 5,575,784; and 5,279,604 and publications WO 98/53780 and WO 99/17693. Each of the above patents and publications is incorporated by reference herein in their entirety.

In embodiments, the absorbent pant 100 of the present disclosure includes a fastening zone area 200 having a plurality of hooks as the surface protrusions 502, the hooks integrally formed from a first nonwoven material, a film, or a combination thereof. In embodiments, the fastening zone area 200 may include a plurality of loops 471 (FIG. 4). The loops 471 may be disposed on a patch joined to the article or may be integrally formed from the first nonwoven or from a second nonwoven material. The first nonwoven may, for example, comprise a portion of the backsheet 140, and the second nonwoven may, for example, comprise a portion of the waist panel 104, 108. Additionally or alternatively, the fastening zone area 200 may include an adhesive.

The article 10 may be wrapped (e.g., folded); and in a wrapped configuration, a portion of the article 10 may be folded inward to cover or at least partially seal one or both leg apertures 130. The wrapped configurations described herein may include folding in one or more directions and may include a wrap-around folding. As shown in FIG. 1, in a worn position, the article 10 is provided with the front half generally facing the back half. The wrapped configuration comprises additional folding or bending. Such folding may comprise folding the article 10 in a halfway fold (such as shown in FIG. 3F) in which a portion of a back half is folded over a portion of a front half (or vice versa) and/or a rolling prior to laterally folding a portion of the article inward to engage the fastening zone area 200. Additionally, or alternatively, the article 10 may be at least partially rolled and/or folded laterally (i.e., towards the longitudinal axis) prior to laterally folding a portion of the article inward to engage the fastening zone area 200.

In embodiments, once the article 10 is in a wrapped configuration, at least one portion of the waist panels 104, 108 may be laterally folded inward to the portion of the article 10 on which the fastening zone area 200 is disposed. Such a lateral folding may be a direct fold or may be a wrap around a first half of the article (e.g., one of the front half or the back half) to land at and engage with the fastening zone area 200 of the second half (e.g., the other of the front half or the back half). It is to be understood, however, that any part of the absorbent article 10 without limitation to the waist panels 104, 108 may be laterally folded inward to engage the fastening zone area 200. Alternatively or additionally, such folding of a portion of the absorbent article 10 such as at least one of the waist panels 104, 108 may include a longitudinal inward folding to engage the fastening zone area 200.

In some aspects, the fastening zone area 200 may be disposed on a back half of the chassis 102, the second waist region 114 is disposed on the back half of the chassis 102 (e.g., a rear waist region), and, in the wrapped configuration, the at least one a portion of the rear waist panels 108, such as a side of one of the waist panels 108a, 108b disposed in the second waist region 114, is configured to be laterally folded inward to engage the fastening zone area 200 on the back half of the chassis 102. In this way, the rear waist panel may at least partially seal a leg aperture 130 while additionally sealing, or at least partially sealing, the respective side portion of the waist regions 112, 114. Additionally, or alternatively, at least a portion of the first waist panels 104 may be configured to be laterally folded to engage the fastening zone area 200 on the back half of the chassis 102, particularly when the first and second panels 104, 108 remain connected in the wrapped configuration.

Likewise, the fastening zone area 200 may be disposed on a front half of the chassis 102, the first waist region 112 is disposed on the first half of the chassis 102 (e.g., front waist region), and, in the wrapped configuration, the at least one a portion of the waist panels 104, such as a side of one of the waist panels 104a, 104b disposed in the front waist region 112, is configured to be laterally folded inward to engage the fastening zone area 200 on the front half of the chassis 102. In this way, the front waist panel may at least partially seal a leg aperture 130 and sealing, or at least partially sealing, opening(s) in the waist regions 112, 114. Additionally, or alternatively, at least a portion of the second waist panels 108 may be configured to be laterally folded to engage the fastening zone area 200 on the front half of the chassis 102, particularly when the first and second waist panels 104, 108 remain connected in the wrapped configuration.

Referring to FIGS. 3A-3E1, respectively, the fastening zone area 200 may include a configuration, and the configuration may include one of the following shapes: a V-shape, a U-shape, a Y-shape, or one or more rectangles, such as a single laterally extending rectangular shape, or a double longitudinally extending rectangular shape that may include two co-aligned rectangular shapes. In some embodiments, the fastening zone area 200 includes a first configuration and the release tape 202 includes a second configuration, and the first configuration and the second configuration may differ by one of a group consisting of: shape, area, orientation, constituent material, or combinations thereof. At least one of the first configuration or the second configuration may include one of a V-shape, a U-shape, a Y-shape, or one or more rectangles. The fastening zone area 200 may be relatively large in area and formed to cover a shaped area, such as that of a rectangular form as shown in FIG. 3E, a circle, or another shape. The fastening zone area 200 may comprise a two-dimensional area that is at least about 1 cm$^2$, or at least about 5 cm$^2$, or at least about 7.5 cm$^2$, or from about 1 cm$^2$ to about 15 cm$^2$, or from about 3 cm$^2$ to about 10 cm$^2$, reciting for each range every 1 cm$^2$ increment therein. The fastening zone area 200 may overlap the longitudinal axis and/or overlap the lateral axis. Additionally, or alternatively, the fastening zone area 200 may include one or more other design elements including at least one of insignia, letters, words, graphics, logos, colors, fonts, shapes, or combinations thereof. Additionally, or alternatively, the surface upon which the fastening zone area 200 is disposed may include graphics or other elements such as printed areas which indicate and highlight the presence of the fastening zone area 200.

In an embodiment, and referring to FIGS. 2-3A, the fastening zone area 200 may include a V-shape fastening zone area 200A. In other aspects, the fastening zone area 200 may include a Y-shape fastening zone area 200B, such as is illustrated in FIG. 3B. In yet other embodiments, the fastening zone area 200 may include a U-shape fastening zone area 200C, such as is illustrated in FIG. 3C. In yet other aspects, the fastening zone area 200E1 may include a single rectangular shape as a rectangular-shape fastening zone area 200E1. A shape of the release tape 200 may differ from the fastening zone area 200 and may overlap and have a greater dimension than the fastening zone area 200.

As noted above, and shown in FIG. 3A, the first width, W1, may be from about 50 mm to about 150 mm, or from about 60 mm to about 100 mm, reciting for each range every 1 mm increment therein. The arms 203, 205 may comprise a width, Wa, of about 10 mm to about 50 mm, or from about 15 mm to about 30 mm, reciting for each range every 1 mm increment therein. The arms 203, 205 may comprise the same width or different widths. The longitudinal distance, L, that the arms 203, 205 extend may be from about 30 mm to about 100 mm, or from about 40 mm to about 60 mm, reciting for each range every 1 mm increment therein. In the U-shaped embodiments, a radius of curvature at each of the outer U-curves at a second longitudinal location 209 may be in a range of from about 10 mm to 12.5 mm (e.g., 1-1.25 cm) such that each diameter curve width is in a range of from about 20 mm to 25 mm (e.g., 2-2.5 cm). In aspects, the fastening elements 503 described herein may be placed in a fastening zone area 200C underlying each of the outer U-curves of the release tape 202C of FIG. 3C.

Figure 3D:
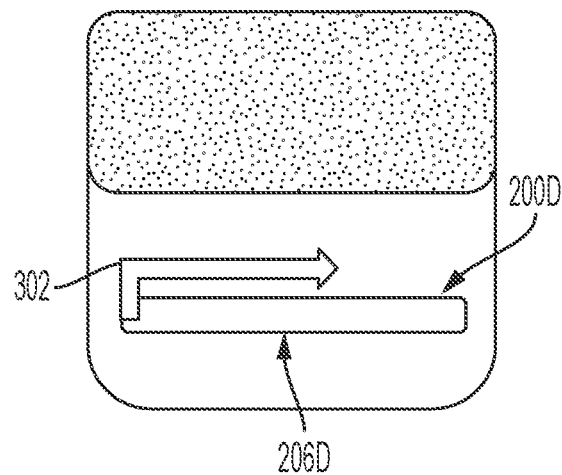
FIG. 3D schematically illustrates a laterally extending rectangular fastening zone area and release tape embodiment for the absorbent pant shown in FIG. 1, according to one or more embodiments shown and described herein.
Figure 3F:
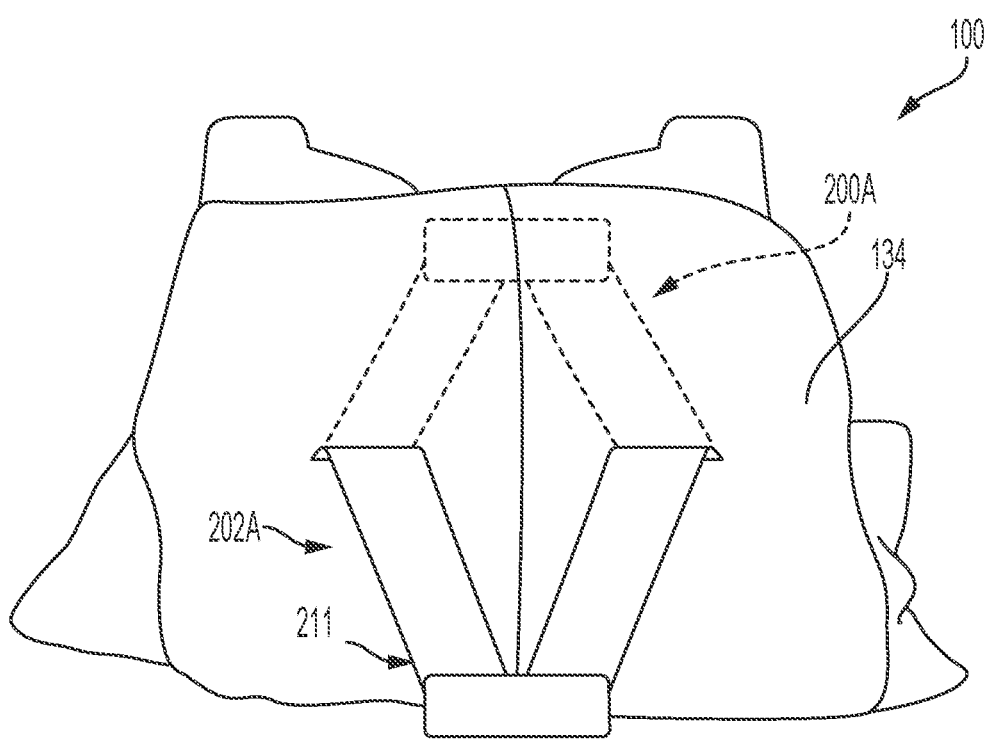
FIG. 3F schematically illustrates the absorbent pant of FIG. 1 in a first position in which a releasable portion of a V-shaped release tape is released from a fastening zone area of the absorbent pant while a permanent portion stays attached such that an end of the releasable portion forms a handle, according to one or more embodiments shown and described herein.

In other embodiments, the fastening zone area 200 may include a single laterally extending rectangular shape fastening zone area 200D, such as is illustrated in FIG. 3D, or a double longitudinally extending rectangular shape fastening zone area 200E, such as is illustrated in FIG. 3E. As shown in FIG. 3D, the fastening zone area 200 may be laterally extending as a singular fastening zone, which may include a rectangular shape. The fastening zone area 200 may be laterally extending on the at least one surface of the first or second waist regions 112, 114 or the crotch region 116. In other aspects, such as shown in FIG. 3E, the fastening zone area 200 may include multiple fastening zones. As a non-limiting example, the fastening zone area 200 as shown in FIG. 3E may include a first arm 203E and a second arm 205E. The second arm 205E may be spaced apart from the first arm 203E by a lateral distance of at least about 10 mm, or at least about 50 mm, or at least about 75 mm, or from about 10 mm to about 150 mm, reciting for said range each 1 mm increment therein.

In aspects, said absorbent pant 100 further includes a release tape 202 disposed in an overlapping relationship with the fastening zone area 200, such as is illustrated in FIGS. 2-3E. The release tape 202 may have the same shape as the fastening zone area 200. The release tape 202 may include a nonwoven material, a film, or combinations thereof. The release tape 202 may be joined to the absorbent pant 100 at a first end 206 (such as first ends 206A of FIG. 3A) and unattached at a second end (i.e., corresponding to the second longitudinal location 209 of FIG. 3A), such that the second end comprises the lift tab 201 (FIG. 3A) configured for release in a direction, such as the direction of an arrow 300 in FIGS. 3A-3B, an arrow 302 in FIG. 3D, or an arrow 304 in FIG. 3E. The release tape 202 may be configurable to serve as a handle 211 (FIG. 3F) in a released configuration, as shown in FIGS. 3F-3H described below. In aspects, the second end is within 2 mm of the second longitudinal position. Said release tape 202 may be joined to the fastening zone area 202D of the absorbent pant 100 at a center position 206D as shown in FIG. 3D and unattached at distal positions, such that the distal positions each include the lift tab 201.

Figure 3G:
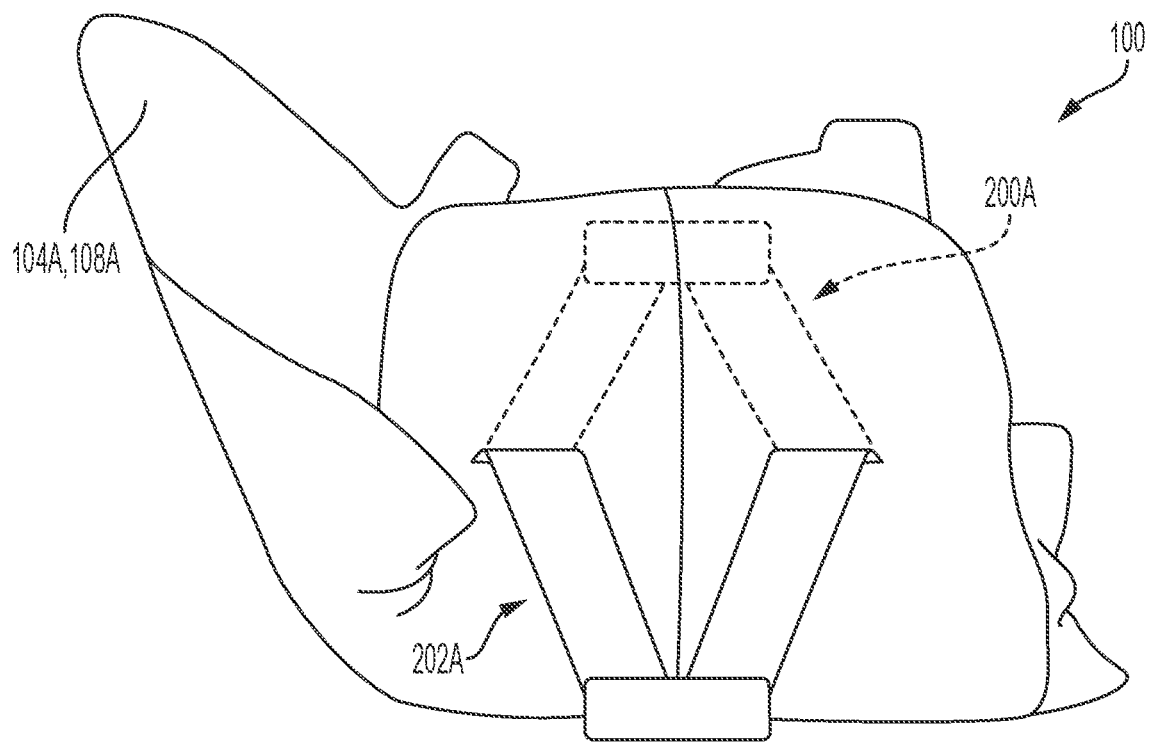
FIG. 3G schematically illustrates the absorbent pant of FIG. 3F in a second position in which a waist panel is being folded out to then laterally fold inward on the fastening zone area.
Figure 3H:
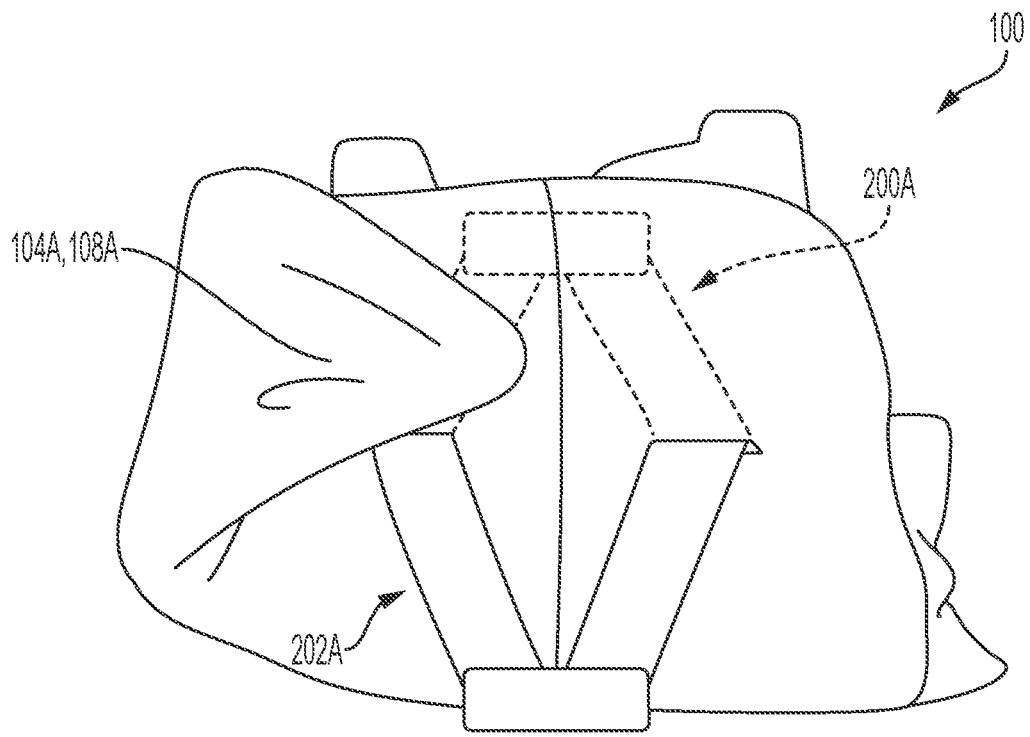
FIG. 3H schematically illustrates the absorbent pant of FIG. 3F in a third position depicting a wrapped configuration in which the waist panel is laterally folded inward onto to engage with the fastening zone area and to cover an associated leg aperture.

Referring to FIGS. 3F-3H, a V-shaped release tape 202A of the absorbent pant 100 is shown respectively in first, second, and third positions. In the first position of FIG. 3F, the outer, garment facing surface 134 of the absorbent pant 100 has been folded over and a releaseable portion of the V-shaped release tape 202A has been released, such as peeled-back, from the garment facing surface 134 to expose the underlying fastening zone area 200A for engagement. An end of the releasable portion once that is released, as shown in FIG. 3F, forms a top part of a handle 211. A permanent portion of the V-shaped release tape 202A remains attached to the absorbent pant 100 to form a bottom part of the handle 211.

In the second position, as shown in FIG. 3G, at least one waist panel 104, 108 is laterally folded out from the absorbent pant 100 (e.g., laterally folded outward from the longitudinal axis 106 of the absorbent pant 100 as shown in FIG. 2). Such an outward lateral folding prepares the waist panel 104, 108 for a lateral inward folding onto the exposed fastening zone area 200A of the absorbent pant 100. In the third position, as shown in FIG. 3H depicting the wrapped configuration, the at least one waist panel 104, 108 that was laterally folded out in FIG. 3G is now laterally folded inward (e.g., laterally folded toward the longitudinal axis 106) onto and to engage with the fastening zone area 200A to at least partially cover and seal an underlying leg aperture 130.

As previously mentioned, the chassis 102 may include the topsheet 138, shown for example, in FIG. 2. The topsheet 138 is generally a portion of the absorbent article that may be positioned at least in partial contact or close proximity to a wearer. Suitable topsheets are generally supple, soft feeling, and non-irritating to a wearer's skin. Further, at least a portion of, or all of, the topsheet may be liquid permeable, permitting liquid bodily exudates to readily penetrate through its thickness. A suitable topsheet may be manufactured from a wide range of materials, such as porous foams, reticulated foams, apertured plastic films, woven materials, nonwoven materials, woven or nonwoven materials of natural fibers (e.g., wood or cotton fibers), synthetic fibers or filaments (e.g., polyester or polypropylene or bicomponent PE/PP fibers or mixtures thereof), or a combination of natural and synthetic fibers. The topsheet 138 may have one or more layers. The topsheet 138 may be apertured, may have any suitable three-dimensional features, and/or may have a plurality of embossments (e.g., a bond pattern). The topsheet 138 may be apertured by overbonding a material and then rupturing the overbonds through ring rolling, such as disclosed in U.S. Pat. No. 5,628,097, to Benson et al., issued on May 13, 1997 and disclosed in U.S. Pat. Appl. Publication No. US 2016/0136014 to Arora et al. Any portion of the topsheet 138 may be coated with a skin care composition, an antibacterial agent, a surfactant, and/or other beneficial agents. The topsheet 138 may be hydrophilic or hydrophobic or may have hydrophilic and/or hydrophobic portions or layers. If the topsheet 138 is hydrophobic, typically apertures will be present so that bodily exudates may pass through the topsheet 138.

As previously mentioned, the chassis 102 may also include the absorbent core 142. As shown for example in FIG. 2, the absorbent core 142 may include a first longitudinal side edge 146 laterally separated from a second longitudinal side edge, and a first end edge 150 longitudinally separated from a second end edge. The absorbent core 142 may also include components such as an acquisition layer and absorbent material that is generally compressible, conformable, non-irritating to the wearer's skin and capable of absorbing and retaining liquids such as urine and other body exudates. The absorbent core 142 can also be manufactured in a wide variety of sizes and shapes (e.g., rectangular, hourglass, T-shaped, asymmetric, etc.). The absorbent core 142 may also include a wide variety of liquid-absorbent materials commonly used in disposable diapers and other absorbent articles. In one example, the absorbent core 142 includes comminuted wood pulp, which is generally referred to as airfelt. Examples of other absorbent materials include creped cellulose wadding; meltblown polymers, including coform; chemically stiffened, modified or cross-linked cellulosic fibers; tissue, including tissue wraps and tissue laminates; absorbent foams; absorbent sponges; superabsorbent polymers; absorbent gelling materials; or any other known absorbent material or combinations of materials.

In certain embodiments, at least a portion of the absorbent core 142 is substantially cellulose free and contains less than 10% by weight cellulosic fibers, less than 5% cellulosic fibers, less than 1% cellulosic fibers, no more than an immaterial amount of cellulosic fibers or no cellulosic fibers. It should be understood that an immaterial amount of cellulosic material does not materially affect at least one of the thinness, flexibility, and absorbency of the portion of the absorbent core 142 that is substantially cellulose free. Among other benefits, it is believed that when at least a portion of the absorbent core 142 is substantially cellulose free, this portion of the absorbent core 142 is significantly thinner and more flexible than a similar absorbent core that includes more than 10% by weight of cellulosic fibers. The amount of absorbent material, such as absorbent particulate polymer material present in the absorbent core may vary, but in certain embodiments, is present in the absorbent core 142 in an amount greater than about 80%, or greater than about 85%, or greater than about 90%, or greater than about 95% by weight of the core. In some embodiments, the absorbent core may comprise one or more channels, wherein said channels are substantially free of absorbent particulate polymer material. The channels may extend longitudinally or laterally. The absorbent core may further comprise two or more channels. The channels may be straight, curvilinear, angled or any workable combination thereof. In nonlimiting examples, two channels are symmetrically disposed about the longitudinal axis. Exemplary absorbent structures for use as the absorbent core are described in U.S. Pat. Nos. 4,610,678; 4,673,402; 4,834,735; 4,888,231; 5,137,537; 5,147,345; 5,342,338; 5,260,345; 5,387,207; 5,397,316, and U.S. patent application Ser. Nos. 13/491,642 and 15/232,901.

The absorbent core 142 may also have a multiple layered construction. A more detailed discussion of various types of multi-layered absorbent cores can be found in U.S. Pat. Nos. 5,669,894; 6,441,266; 5,562,646; 7,750,203; 7,744,576; European Pat. No. EP0565606B1; PCT Publication No. WO 2006/015141, which are all hereby incorporated by reference. In some embodiments, the absorbent pant 100 includes an absorbent core 142 that is stretchable. In such a configuration, the absorbent core 142 may be adapted to extend along with other materials of the chassis in longitudinal and/or lateral directions. The absorbent core 142 can also be connected with the other components of the chassis 102 various ways. For example, the absorbent pant 100 may include a "floating core" configuration or a "bucket" configuration wherein the absorbent pant 100 includes an anchoring system that can be configured to counteract the forces tending to move the article on the wearer. Such an anchoring system can also be configured to anchor itself to a body of a wearer by contacting various parts of the body. In this way, the anchoring system can balance the collected moving forces with holding forces obtained from the anchoring. By balancing the collected moving forces with the obtained holding forces, the anchoring system can at least assist in holding the disposable wearable absorbent article in place on a wearer.

Embodiments of the absorbent pant 100 may also include pockets for receiving and containing waste, spacers which provide voids for waste, barriers for limiting the movement of waste in the article, compartments or voids which accept and contain waste materials deposited in the diaper, and the like, or any combinations thereof. Examples of pockets and spacers for use in absorbent products are described in U.S. Pat. Nos. 5,514,121; 5,171,236; 5,306,266; 5,397,318; 5,540,671; and PCT Application WO 93/25172; which are all hereby incorporated by reference. Examples of compartments or voids are disclosed in U.S. Pat. Nos. 4,990,147; and 6,482,191, which are all hereby incorporated by reference. Examples of transverse barriers are described in U.S. Pat. Nos. 5,554,142 and 5,653,703; and PCT Patent Publication WO 94/14395, which are all hereby incorporated by reference. In addition to or in place of the voids, pockets and barriers, described above, embodiments of the absorbent article may also include a waste management element capable of effectively and efficiently accepting, storing and/or immobilizing viscous fluid bodily waste, such as runny feces, such as described in U.S. Pat. No. 6,010,491, which is hereby incorporated by reference.

In aspects, the absorbent pant 100 of the present disclosure further includes a seam that joins the first and second waist panels 104, 108, which may be formed by a frangible bond. The chassis 102 may include one or more frangible seams configured to join the first and second waist panels 104, 108 to connect the first waist region 112 with the second waist region 114. As used herein "frangible bond" refers to attachment of two or more elements or portions of elements together in which they may be separated during normal use, but upon separation cannot be re-attached without substantial degradation of fastener performance. A frangible bond is generally designed to be broken by the consumer at some point during normal use of the article. The breaking of this bond may be optional depending on desired use, or it may occur in substantially all use occasions.

Depending on the particular configuration, it is to be appreciated that various types of fastening elements may be used with the absorbent pant 100. In one example, the fastening elements include hook & loop fasteners, such as those available from 3M or Velcro Industries. In other examples, the fastening elements include adhesives and/or tap tabs, while others are configured as a macrofastener or hook (e.g., a MACRO or "button-like" fastener). Some exemplary fastening elements and systems are disclosed in U.S. Pat. Nos. 3,848,594; 4,662,875; 4,846,815; 4,946,527; 5,151,092; and 5,221,274, which are all hereby incorporated by reference. Additional examples of fasteners and/or fastening elements are discussed in U.S. Pat. Nos. 6,482,191; 6,251,097; and 6,432,098, which are all hereby incorporated by reference. Other fastening systems are described in more detail in U.S. Pat. Nos. 5,595,567; 5,624,427; 5,735,840; and 5,928,212, which are all hereby incorporated by reference.

Referring to FIG. 4, the waist panels 104, 108 may include a receiving zone area 400 that may include a nonwoven substrate 470. The nonwoven substrate 470 may be applied in overlying relationship to an outwardly-facing surface of a polymeric layer 472 to provide a plurality of loops 471 that may define spaced open areas bounded by inter-engaged individual fibers. The receiving zone area 400 may be disposed on the waist panels 104, 108 and be configured to be engaged with the fastening zone area 200 of the waist regions 112, 114 or the crotch region 116 as described herein. In embodiments, the fastening zone area 200 may be disposed on the at least one surface of the crotch region 116 and a receiving landing area, such as the receiving zone area 400 of FIG. 4, may be disposed on the at least one of the waist panels 104, 108 configured to be laterally folded inward to engage the fastening zone area 200.

Referring to FIG. 5, the fastening zone area 200 may include one or more surface protrusions 502 for engagement with the receiving zone area 400 of the waist panels 104, 108. The surface protrusions 502 may have one or more of a cross-sectional configuration, a height H, a width, a length, an angular inclination, and a hook end configuration. The one or more surface protrusions 502 may be hooks formed normal to or at angle with respect to a garment surface of a garment material. Further, the one or more surface protrusions 502 as described herein may be of various modifiable configurations in any directionality of the hook end with respect to the garment surface, such as a left, right, angled, curved, or straight up direction. A surface protrusion 502 may be a projection that is normal to the garment surface. The cross-sectional configuration of surface protrusions 502 in FIG. 5 is shown as a sectional view taken generally perpendicular to a surface 506 of a garment material 501 so to divide an individual surface protrusion 502A into equal halves, extending generally parallel to a direction defined by a projection of an individual surface protrusion 502A on the surface 506. A further cross-sectional configuration of the surface protrusions 502 is a sectional view taken generally parallel to the surface 506 of the garment material 501. The further cross-sectional configuration may be of any configuration, for example, a circle, an ellipse, an oval, a triangle, a square, a rectangle, an elongated rectangle and a polygonal. The further cross-sectional configuration can be substantially consistent dimension-wise throughout the height H of the individual surface protrusion 502A, or it can be substantially tapered by being larger at the surface of the garment material 501.

The height H of surface protrusions 502 is the distance taken generally perpendicular between the surface 506 of the garment material 501 and the highest point of the individual surface protrusion 502A extending above the surface 506. The width of the surface protrusions 502 may be taken from the base of the individual surface protrusion 502A in a direction defined by a projection of the individual surface protrusion 502A on the surface 506 of the garment material 501. An angular inclination of the surface protrusions 502 may be relative to the surface 506 of the garment material 501. Distal end forms 504 of the surface protrusions 502 may have various configurations, such as the hook that is illustrated by the non-limiting example of FIG. 5.

The surface protrusions 502 may be formed by a method of manufacture. Suitable methods are described in U.S. patent application Ser. No. 16/545,425.

Figure 6:
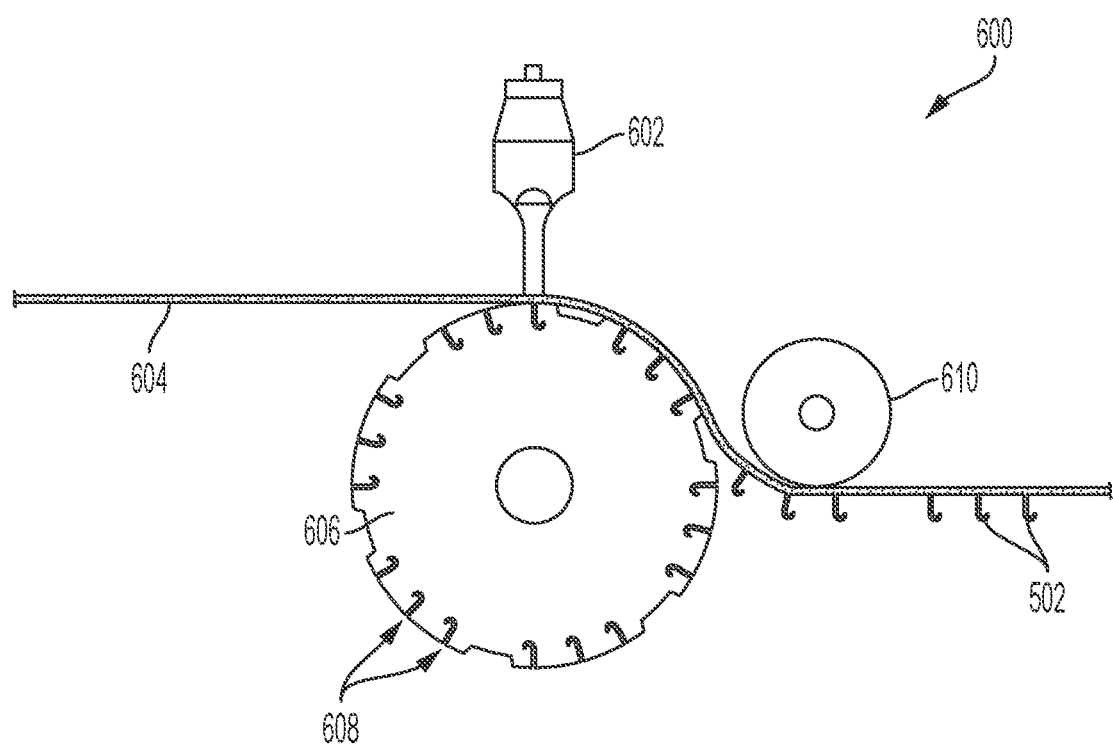
FIG. 6 schematically illustrates a cross-sectional side view of an apparatus and process for forming protrusions on an advancing substrate, according to one more embodiments shown and described herein.

Referring to FIG. 6, a schematic side view of an apparatus for forming protrusions 502 on an advancing substrate 604 in order to dispose a fastening zone area 200 on the substrate 604 is shown. As shown in FIG. 6, a continuous substrate 604 may advance in a machine direction (MD) adjacent a protrusion forming apparatus or system 600 that is configured to form discrete zones of first body parts and distal hook ends at respective distal ends 504 of surface protrusions 502 on the substrate 604. In aspects, a portion of the substrate 604 is a thermoplastic material substrate. In embodiments, the substrate 604 is nonwoven material. It is to be appreciated that various configurations of protrusion forming systems 600 may be used to integrally mold surface protrusions 502 directly on the substrate 604, wherein the substrate material may serve not only as a structural component material for other purposes, but also as a source of material, such as a polymer for example, for formation of the surface protrusions 502.

The portion of the substrate 604 of FIG. 6 as referenced herein to form the one or more surface protrusions 502 may include the garment material 501 of FIG. 5 such that a referenced surface 506 of the garment material 501 is also a surface of the substrate 604. In aspects, the garment material 501 is a nonwoven substrate.

Thus, the absorbent pant 100, fastening zone areas 200, and surface protrusions 502 as described herein may be formed from methods of manufacture utilizing assemblies and systems such as the system 600 shown in FIG. 6. As a non-limiting example, and referring to FIG. 6, a portion of the substrate 604 is in contact with the molding roll 606 and vibrating energy source 602 and may be softened by the vibration energy from the energy source 602 and a desired portion of the thermoplastic material caused to enter into one or more cavities 608 of the molding roll 606, forming hook-shaped or otherwise shaped elements or projections 502 on the surface of a substrate 604 as the roll turns in a rotary forming process. In aspects, the energy source 602 is an ultrasonic force, such as a sonotrode. The energy source 602 applies energy to the advancing substrate 604 such that softened material of the substrate 604 may be pressed or otherwise move or flow into the openings (e.g., cavities 608) to form a zone of surface protrusions 502. In turn, the surface protrusions 502 are formed directly from and integrally with the material of the substrate 604.

In the rotary forming process, a requisite amount of pressure may be applied to the thermoplastic material to assist in its entry and fill-out of the cavities 608, for example by a secondary roll 610. The secondary roll may also aid in straightening out the substrate 604 following the formation of the surface protrusions 502 on the surface of the substrate 604 by the energy source 602 and molding roll 606. The remaining portions of the thermoplastic substrate 604 may function as a carrying strip for the hook projections 502.

Figure 7:
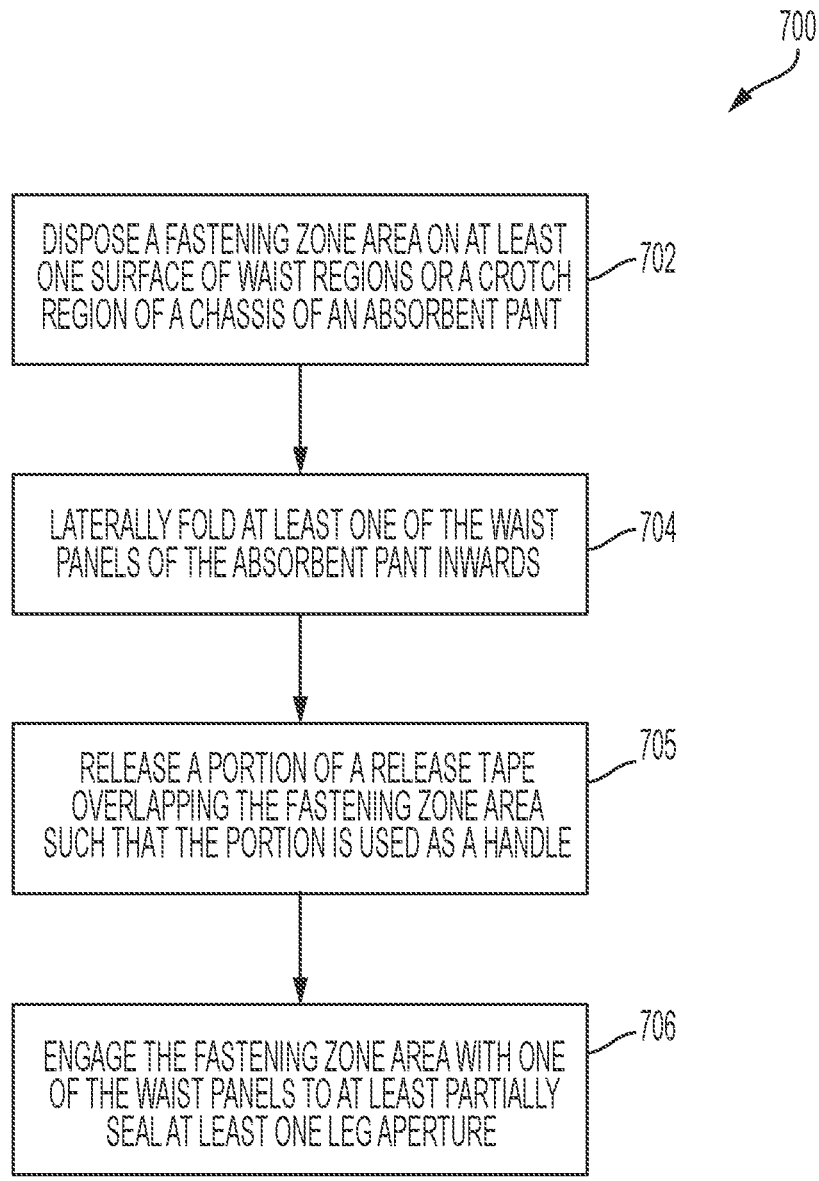
FIG. 7 schematically illustrates a process for manufacturing and wrapping the absorbent pant of FIG. 1, according to one or more embodiments shown and described herein.

Referring to the flow chart of FIG. 7, a process 700 is shown with block 702 for manufacturing the absorbent pant 100 with, for example, the system 600 of FIG. 6, as well as blocks 704-706 for later wrapping the absorbent pant 100 after used as described herein. The block 702 describes disposing the fastening zone area 200 on at least one surface of waist regions 112, 114 or the crotch region 116 of the chassis 102 of the absorbent pant 100 as described herein, which may be accomplished by the system 600 of FIG. 6 as described herein. Regarding a method of use and wrapping for the manufactured absorbent pant 100, the block 704 describes laterally folding at least one of the waist panels 104, 108 of the absorbent pant 100 inwards (i.e., towards the inner and potentially central portion 208). The block 705 describes releasing a portion of the release tape 202 overlapping the fastening zone area 200 of the absorbent pant 100 such that the released portion is used as the handle 211 (FIG. 3F) with which to pick up and, for example, dispose of the soiled absorbent pant 100.

The block 706 describes then engaging the fastening zone area 200 with one or both of the waist panels 104, 108 to at least partially seal at least one leg aperture 130. In embodiments, the waist panels 104, 108 include a nonwoven material, such as a nonwoven substrate 470 including loops as illustrated in FIG. 4. The fastening zone area 200 on the waist regions 112, 114 or crotch region 116 may include surface protrusions 502 that may be hooks as described herein that are capable of engaging the loops of the nonwoven substrate 470 of the waist panels 104, 108. Alternatively, in embodiments, the waist panels 104, 108 may include surface protrusions 502 such as hooks, and the fastening zone area 200 on the waist regions 112, 114 or crotch region 116 may include the nonwoven substrate 470 including loops, wherein the surface protrusions 502 of the waist panels 104, 108 are capable engaging the loops of the nonwoven substrate of the fastening zone area 200.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any disclosure disclosed or claimed herein or that it alone, or in any combination with any other reference or references, teaches, suggests or discloses any such disclosure. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be obvious to those skilled in the art that various other changes and modifications can be made without departing from the spirit and scope of the disclosure. It is therefore intended to cover in the appended claims all such changes and modifications that are within the scope of this disclosure.

What is claimed is:

1. An absorbent pant comprising:
   a chassis comprising a topsheet, a backsheet, and an absorbent core between the topsheet and the backsheet;
   longitudinally opposing first and second waist regions, and a crotch region disposed between the first and second waist regions;
   opposing first and second waist panels longitudinally disposed in the first and second waist regions, wherein the first and second waist panels connect the first waist region with the second waist region to form a waist opening and a pair of leg apertures; and
   a fastening zone area on at least one surface of the absorbent pant;
   a release tape, at least a portion of the release tape disposed in an overlapping relationship with the fastening zone area in a taped configuration and configured to be separated from the fastening zone area in a released configuration to be released from the overlapping relationship; wherein in a wrapped configuration, at least one of the waist panels is configured to be laterally folded inward to engage the fastening zone area when the portion of the release tape is separated from the fastening zone area in the released configuration such that at least one of the leg apertures is at least partially sealed; and
   wherein the fastening zone area comprises a plurality of hooks integrally formed from a first nonwoven material, and wherein the first nonwoven material comprises the backsheet.

2. The absorbent pant of claim 1, wherein the fastening zone area comprises an area of at least 1 cm$^2$.

3. The absorbent pant of claim 1, wherein the fastening zone area is disposed on the at least one surface in the crotch region and a receiving landing area is disposed on the at least one of the waist panels configured to be laterally folded inward to engage the fastening zone area.

4. The absorbent pant of claim 1, wherein the at least one of the waist panels comprise loops integrally formed from a second nonwoven material.

5. The absorbent pant of claim 1, wherein the release tape is permanently joined to the absorbent pant at a first end and releasably joined at a second end.

6. The absorbent pant of claim 1, wherein the chassis comprises one or more frangible seams configured to join the first and second waist panels to connect the first waist region with the second waist region.

7. The absorbent pant of claim 1, wherein:
   the fastening zone area is disposed on a back half of the chassis;
   the second waist region is disposed on the back half the chassis; and
   in the wrapped configuration, the at least one of the waist panels disposed in the second waist region is configured to be laterally folded inward to engage the fastening zone area on the back half of the chassis.

8. The absorbent pant of claim 1, wherein the fastening zone area is laterally extending on the at least one surface.

9. The absorbent pant of claim 1, wherein the fastening zone area comprises a first arm and a second arm, wherein the second arm is spaced apart from the first arm by a lateral distance of at least 10 mm.

10. The absorbent pant of claim 1, wherein the fastening zone area comprises first and second arms, wherein the first and second arms are separated by a lateral distance of at least 5 mm at a first longitudinal location and wherein the first and second arms intersect at a second longitudinal location, the second longitudinal location longitudinally displaced with respect to the first longitudinal location.

11. The absorbent pant of claim 1, wherein the fastening zone area comprises a first configuration, and the release tape comprises a second configuration, wherein the first configuration and the second configuration differ by one of a group consisting of: shape, area, orientation, constituent material, or combinations thereof.

12. The absorbent pant of claim 11, wherein at least one of the first configuration or the second configuration comprises one of a V-shape, a U-shape, a Y-shape, or one or more rectangles.

13. The absorbent pant of claim 11, where at least one of the first configuration or second configuration comprises one or more design elements, the one or more design elements comprising at least one of insignia, letters, words, graphics, logos, colors, fonts, shapes, or combinations thereof.

14. The absorbent pant of claim 1, wherein the release tape is permanently joined to the absorbent pant at a first end and unattached at a second end, such that the portion of the release tape comprises the second end and the second end comprises a lift tab configured to aid in transitioning from the overlapping relationship to the released configuration.

15. An absorbent pant comprising:
a chassis comprising a topsheet, a backsheet, and an absorbent core between the topsheet and the backsheet;
longitudinally opposing first and second waist regions, and a crotch region disposed between the first and second waist regions;
opposing first and second waist panels longitudinally disposed in the first and second waist regions, wherein the first and second waist panels connect the first waist region with the second waist region to form a waist opening and a pair of leg apertures; and
a fastening zone area on at least one surface of the absorbent pant;
a release tape, at least a portion of the release tape disposed in an overlapping relationship with the fastening zone area in a taped configuration and configured to be separated from the fastening zone area in a released configuration to be released from the overlapping relationship; wherein in a wrapped configuration, at least one of the waist panels is configured to be laterally folded inward to engage the fastening zone area when the portion of the release tape is separated from the fastening zone area in the released configuration such that at least one of the leg apertures is at least partially sealed; and
wherein the release tape comprises a nonwoven material, a film, or combinations thereof, and wherein the release tape is configured to cover the fastening zone area in a taped configuration and to serve as a handle in a released configuration.

\* \* \* \* \*